United States Patent [19]

LeGrand et al.

[11] Patent Number: 5,014,442
[45] Date of Patent: May 14, 1991

[54] UNIVERSAL MEASURING SYSTEM

[75] Inventors: Pierre N. LeGrand, Soumagne, Belgium; James G. Ballard, Waukesha, Wis.; Reinald D. Liegel, Waukesha, Wis.; Craig A. Wisner, Wauwatosa, Wis.

[73] Assignee: Hein-Werner Corporation, Waukesha, Wis.

[21] Appl. No.: 476,964

[22] Filed: Feb. 7, 1990

[51] Int. Cl.⁵ .......................... G01D 21/00; G01B 5/20
[52] U.S. Cl. ........................................... 33/608; 33/288
[58] Field of Search ................. 33/600, 608, 546, 551, 33/552, 288; 72/705

[56] References Cited

U.S. PATENT DOCUMENTS

| | | | |
|---|---|---|---|
| 4,098,003 | 7/1978 | Nelring | 33/600 |
| 4,329,784 | 5/1982 | Bjork | 33/608 |
| 4,342,154 | 8/1982 | Legrand | 33/288 |
| 4,366,624 | 1/1983 | Bergstrom | 33/600 |
| 4,490,918 | 1/1985 | Clausen | 33/288 |
| 4,523,384 | 6/1985 | Giacomini | 33/608 |
| 4,601,105 | 7/1986 | Yamazaki et al. | 33/288 |
| 4,719,704 | 1/1988 | Gogg | 33/608 |
| 4,922,623 | 5/1990 | Alorich et al. | 33/608 |

FOREIGN PATENT DOCUMENTS

| | | | |
|---|---|---|---|
| 2396952 | 3/1979 | France | 33/208 |
| 2547047 | 12/1984 | France | 33/608 |

*Primary Examiner*—Thomas B. Will
*Attorney, Agent, or Firm*—Foley & Lardner

[57] ABSTRACT

A universal measuring bridge for determining the amount of misalignment of the datum points on a damaged vehicle, the bridge including a main beam formed from two extruded box beams, each box beam including a reference surface and an upper and lower track, the box beams being connected with the reference surfaces in a precise parallel spaced relation and the tracks also in a precise parallel spaced relation to each other and to the corresponding tracks on the other side, a slide arm having an upper and lower track and an upper and lower rail on each side and a fixed guide and a movable guide on the bottom for aligning the slide arm on the main beam and a cross slide mounted on each end of the slide arm, the cross slide including a pair of rollers positioned to ride on the lower track on each side of the slide arm and a compensating roller positioned to ride on the upper track, the rollers on the lower track being adjustable with respect to the lower track and movable into engagement with the inside of the rails. An overhead bridge assembly for measuring upper body datum points can be mounted on each end of the main beam, each assembly includes both adjustable cross bars and longitudinally extending bars for supporting both vertical and horizontal pointers.

31 Claims, 6 Drawing Sheets

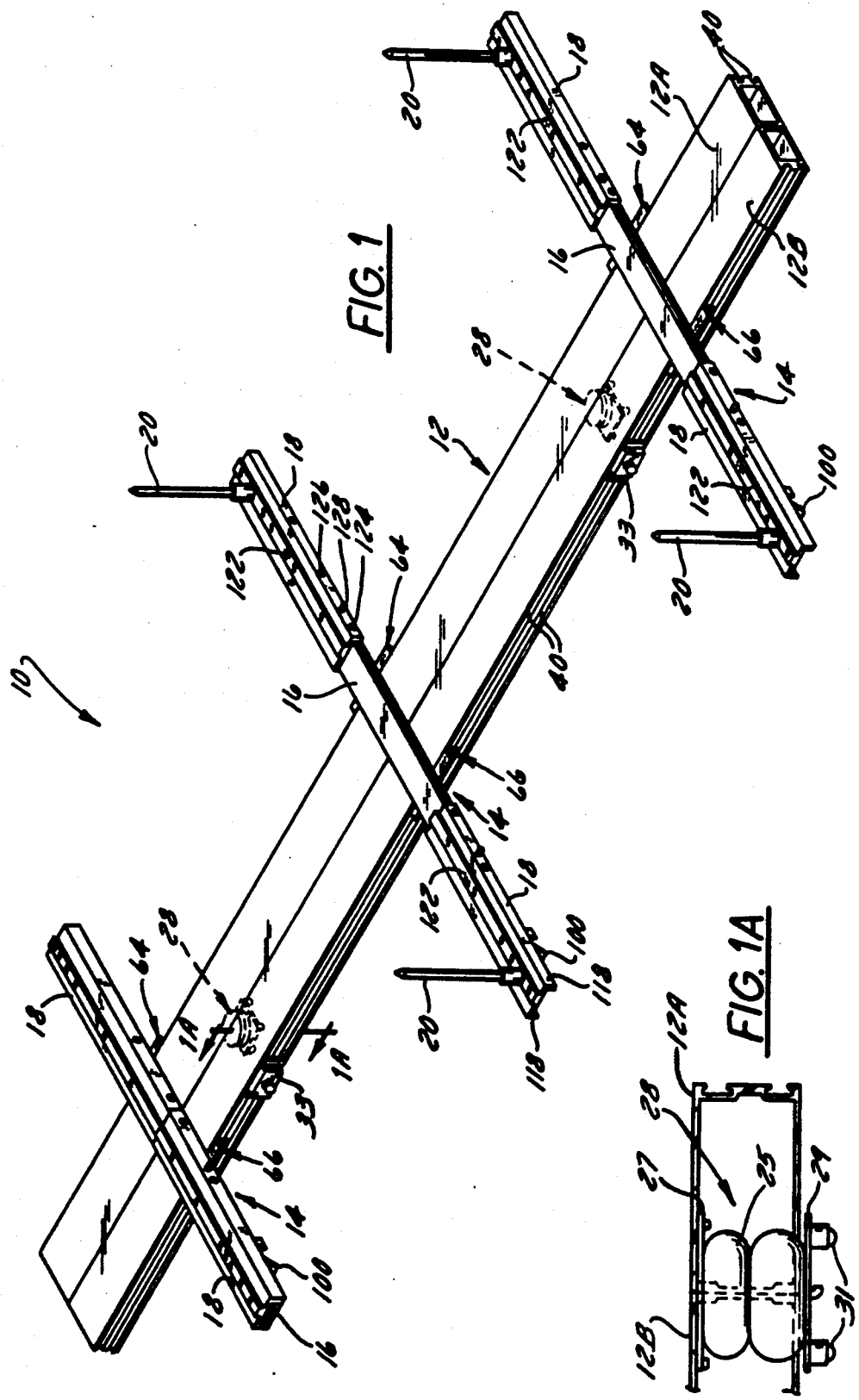

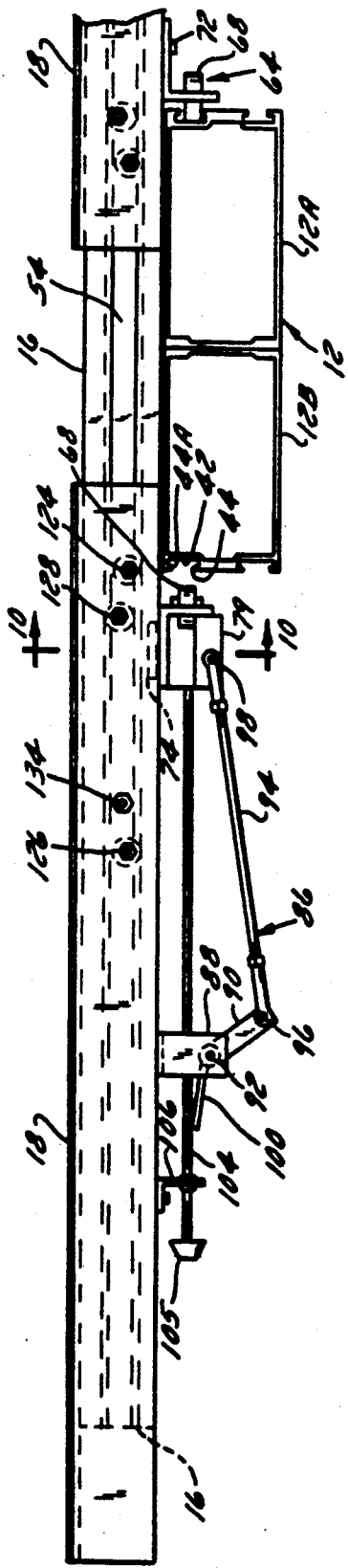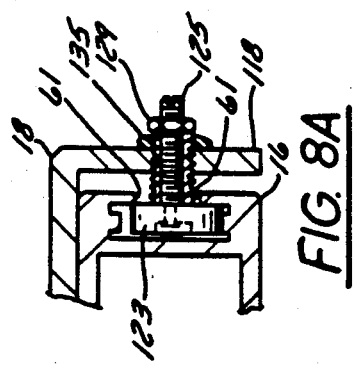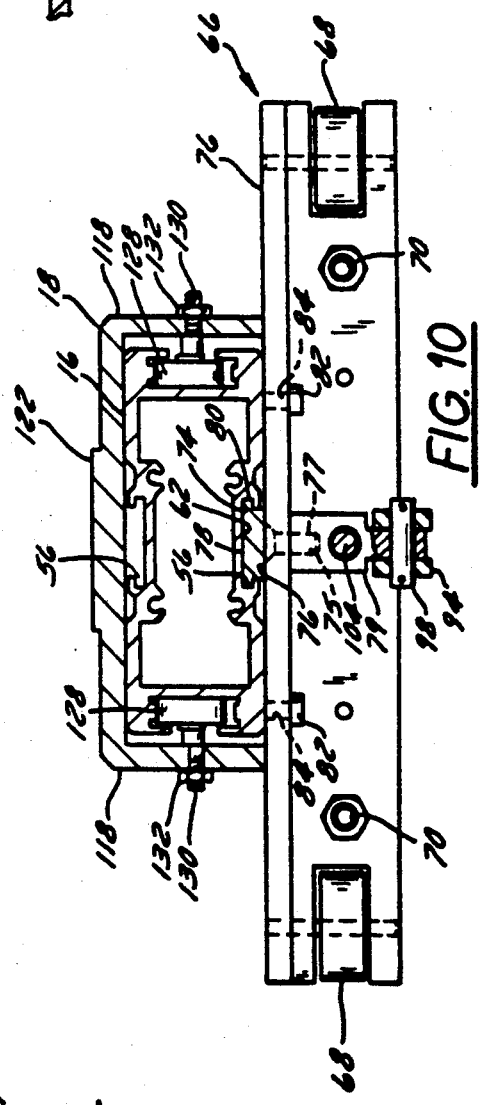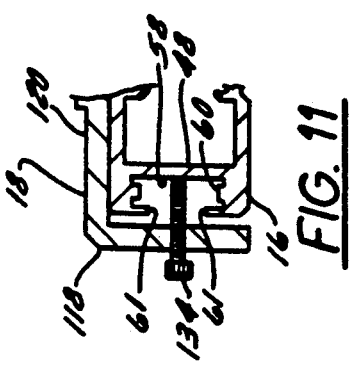

UNIVERSAL MEASURING SYSTEM

FIELD OF THE INVENTION

The present invention relates to a universal measuring bridge for verifying the datum points on the frame and upper body of a vehicle and more particularly to a center beam type bridge having removable cross members.

BACKGROUND OF THE INVENTION

It should first be noted that each type of vehicle has a body which is symmetrically designed with respect to a datum plane which is used to establish the unique longitudinal, lateral and vertical dimensions for each vehicle. The manufacturers provide data holes in the frame of the vehicle which are used to provide the correct location of the datum points with respect to the longitudinal center line of the frame. A data sheet is developed for each type of frame for each model of an automobile. In the event of an accident, a portion of the frame may be deformed, moving one or more of the datum points in one or more directions longitudinally, laterally or vertically, thus destroying the symmetry of the vehicle.

Each of the data sheets for a particular model vehicle is provided with two zero lines, one near the front and one near the back of the auto. If the damage occurs in the front of the vehicle, the zero line in the back is used as a reference line. If the damage is in the back of the vehicle, the zero line in the front of the vehicle is used as the reference point. There are normally two datum points on the zero line. Depending on the location of the damage, the main beam is initially positioned under the vehicle and two vertical attachments are mounted on one of the bridge cross slides at the datum point positions for the zero line noted on the data sheet. The bridge is then raised to move the vertical attachments into engagement with the datum points on the zero line. A third and generally fourth vertical attachment is mounted on another cross slide in a position to engage third and fourth datum points on the vehicle. The cross slide is then moved to align the third and fourth vertical attachments with the third and fourth datum points. The measuring bridge is then located in the center of the vehicle and establishes a datum plane parallel with the bottom of the vehicle.

After orienting the measuring bridge under the vehicle, additional vertical attachments are mounted on the cross slides at the datum points indicated on the data sheet to determine the deviation of the damaged or deformed portions of the frame. A system as described above is available under the trade name P-188 Universal Measuring System and manufactured by the assignee of the present invention.

The P-188 measuring system is generally provided with two fixed slide arms and 2-4 independent slide arms, each of which is affixed to the center beam for longitudinal movement with respect to the center beam. Because of their fixed relationship with the center beam, it often becomes necessary to readjust the slide arms because of interference with the anchoring clamps which are attached to the vehicle. Whenever this occurs, the measuring bridge must be completely removed from the vehicle, the slide arms rearranged as required, and the measuring bridge realigned with the vehicle. Since time is essential in the cost of repairing a vehicle, the additional time required to reset the bridge increases the overall cost of the repair.

SUMMARY OF THE INVENTION

The present invention relates to a center beam type measuring bridge which requires only three slide arms, each of which is removably mounted on the center beam so that they can be removed and reattached to the center beam without resetting the bridge to the vehicle.

A unique center beam is also provided in the measuring bridge which eliminates inaccuracies which are often present in large extruded longitudinal beams. In this regard, the center beam according to the present invention is formed of two small extruded box beams which may have minor inaccuracies. The box beams are precision extruded to provide accurate calibrated surfaces on the outside side walls of the beams. The two box beams are then assembled with the calibrated surfaces, i.e. longitudinal rail surfaces and vertical side surfaces, in a precise parallel relationship and the two box beams then connected to form a single beam with the calibrated surfaces located in a precise parallel spaced relationship. Since the calibrated surfaces are the only surfaces used in operating the bridge, any minor inaccuracies elsewhere along the beam will not affect the accuracy of the bridge.

One of the important advantages of the present invention is the ability to remove the slide arms from the center beam without removing the bridge from the vehicle.

Cross slides are provided on the slide arms for supporting vertical pointers which are used to verify the location of the datum points on the vehicle frame. The cross slides are each provided with a set of six adjustable roller assemblies for supporting the cross slides for movement on the precision extruded surfaces provided on the slide arms. Unique vertical and horizontal compensating roller assemblies are provided on each side of the cross slide for stabilizing the cross slides on the precision extruded surfaces on each side of the slide arms.

One of the most important features of the present invention is the formation of the center beam from two small box beams which eliminates the problem of longitudinal distortion normally encountered in large extruded beams.

Other principal features and advantages of the invention will become apparent to those skilled in the art upon review of the following drawings, the detailed description and the appended claims.

DETAILED DESCRIPTION OF THE DRAWINGS

FIG. 1 is a perspective view of the universal measuring bridge according to the present invention.

FIG. 1A is a view of a portion of the main beam showing the bellows assembly.

FIG. 6 is a view similar to FIG. 4 showing the slide arm released from the center beam.

FIG. 8A is an enlarged cross sectional view of one of the compensating roller assemblies.

FIG. 10 is a cross sectional view taken on line 10—10 of FIG. 6 showing the arrangement of the slide arm, angle guide and cross slide.

FIG. 11 is a cross sectional view of the thumb screw for locking the cross slide to the slide arm.

Figure 3:
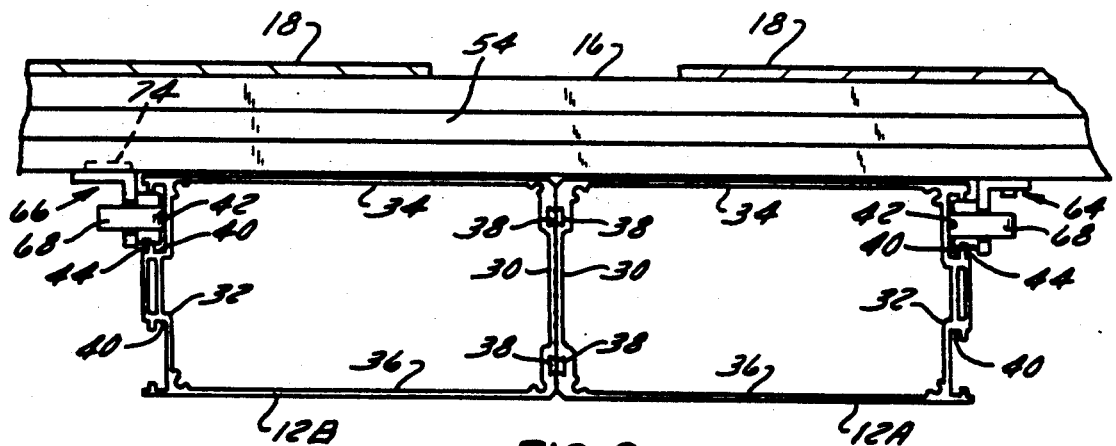
FIG. 3 is an end view of a portion of the measuring bridge showing the connections of box beams that make up the center beam.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DESCRIPTION OF THE PREFERRED EMBODIMENTS

Figure 2:
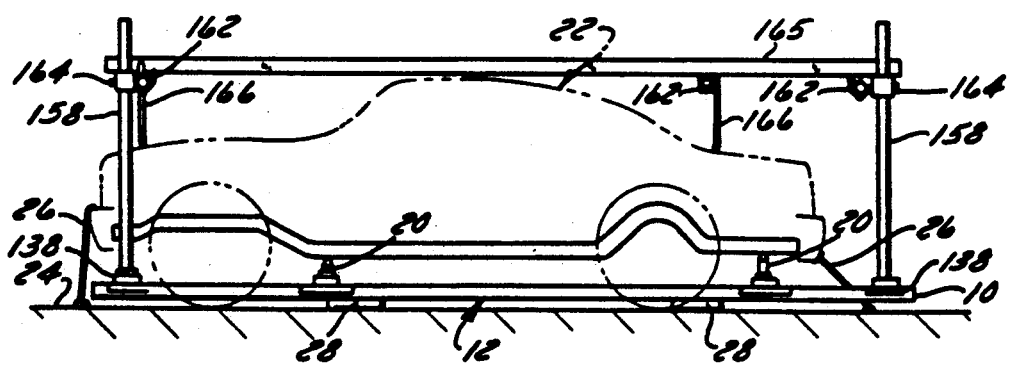
FIG. 2 is a side view in elevation showing the measuring bridge elevated into engagement with the datum points on a vehicle.

The universal measuring bridge 10 according to the invention as shown in FIGS. 1 and 2 generally includes a main beam 12 and three slide arm assemblies 14. Each slide arm assembly includes a slide arm 16 and a pair of cross slides 18 mounted on each end of the slide arms 16. Various shaped vertical extensions 20 are secured to the cross slides 18 for matingly engaging the datum points on the vehicle 22. In this regard, the vehicle 22 is generally supported or secured to a fixed base 24 by anchoring clamps 26. The measuring bridge 10 is positioned beneath the vehicle and biased into engagement with the datum points on the vehicle by means of an air suspension system shown in the form of a bellows assembly 28. Although a pneumatic system is shown and described herein, it is within the contemplation of this invention to use hydraulic spring or pneumatic assemblies to support the bridge 10.

Suspension System

The suspension system includes two bellows assemblies 28, as shown in FIG. 1A, mounted within the main beam 12. Each assembly 28 includes a double bellows 25 mounted between a fixed plate 27 secured to the main beam and a roller plate 29. The roller plate including a number of roller assemblies 31 mounted on plate 29 for supporting the main beam on the floor. A regulator 33 is mounted on the main beam 12 and connected to each bellows 25. It should be noted that the bellows 25 are mounted within the main beam 12 to reduce the space between the floor and the main beam. When the bellows 25 are inflated the main beam will rise to move the bridge into engagement with the vehicle as described hereinafter.

Main Beam

The main beam 10 has been designed to reduce the amount of twist normally encountered in a large extruded longitudinal box beam. This has been accomplished by forming the beam 12 from two identical box beams 12A and 12B thus reducing the normal deflection encountered in a large box beam to less than one half. Each box beam 12A, 12B as shown in FIG. 3 includes an inside wall 30 and an outside wall 32. The side walls are connected by an upper wall 34 and a lower wall 36.

Each of the inside walls 30 is provided with a pair of under cut grooves 38. The outside walls 32 are provided with a pair of elongate grooves 40 one of which is used to provide a guide for the slide arm assemblies 14.

In this regard, the upper 40 is precision extruded to form a vertical guide surface or wall 42 in the groove, as shown in FIG. 3, which extends the full length of the beam. A pair of precision extruded roller tracks on rails 44 are also provided in each groove 40 in a parallel spaced relation to the guide surface 42 and to each other. As more specifically described hereinafter, the vertical surfaces 42 and the lower tracks or rails 44 provide a guide or reference surface for the slide arm assemblies 14.

In order to accurately align the guide surfaces 2 and tracks 44 in the outside walls 32 of the beams 12A and 12B, the outside walls 32 of the beams must be accurately aligned one with the other before the inside walls 30 are connected. This is accomplished by mounting each beam 12A and 12B in a fixture which has guides that interengage with the guide surfaces 42 and the tracks 44. With this arrangement, it is not necessary to precisely align the grooves 38 nor the upper and lower walls 34 and 36. Once the beams are aligned in the fixture, the gap between the inside walls 30 is filled with an epoxy resin that also fills the grooves 38. The epoxy is then allowed to set to permanently connect the beams 12A and 12B. When the beam 12 is released from the fixture, any deviation in alignment of the inside walls 30 or upper and lower walls 34 and 36 will have no affect on the alignment of the grooves 40. However, the vertical surfaces 42 will be located in a parallel spaced relation and the upper and lower tracks 44 will be in upper and lower planes which are perpendicular to the planes of the vertical surfaces 42.

Slide Arm Assemblies

Figure 8:
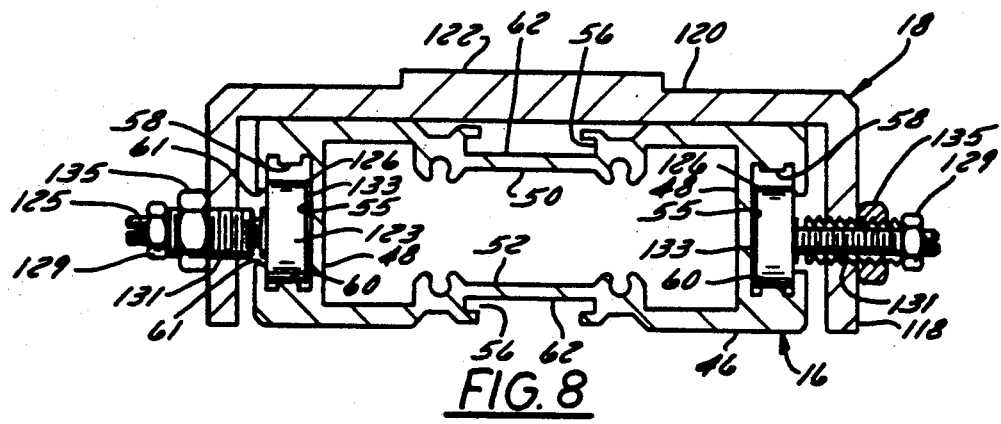
FIG. 8 is a view taken on line 8—8 of FIG. 7 showing a cross section of the support roller on the cross slide aligned with the lower track on the slide arm.
Figure 9:
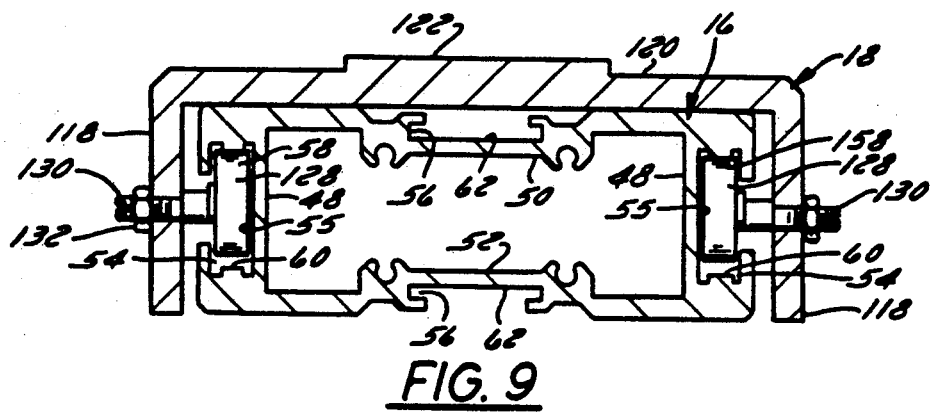
FIG. 9 is a view taken on line 9—9 showing the compensating roller for the cross slide aligned with the upper track on the slide arm.

Each of the slide arm assemblies as noted above includes a slide arm 16 and a pair of cross slides 18. The slide arm 16 is formed from a rectangular extrusion 46, as shown in FIGS. 8, 9 and 10, having side walls 48, an upper wall 50 and a lower wall 52. A groove 54 is provided on the outside of each of the sidewalls 48. A groove 56 is provided in each of the upper and lower walls 50, 52, respectively. Each of the grooves 54 are provided with precision extruded upper tracks 58, lower tracks 60 and upper and lower rails 61. A guide surface 55 is provided on the inside surface of groove 54. The guide grooves 56 are also precision extruded to provide a guide surface 62 on the top and bottom of the slide arm 16. It should be noted that the relationship of the tracks 58 and 60 and the guide surfaces 55 and 62 are symmetrical so that the slide arm 16 can be assembled in any position, i.e., turned upside down or turned around, without affecting the relationship of the machined surfaces.

Figure 4:
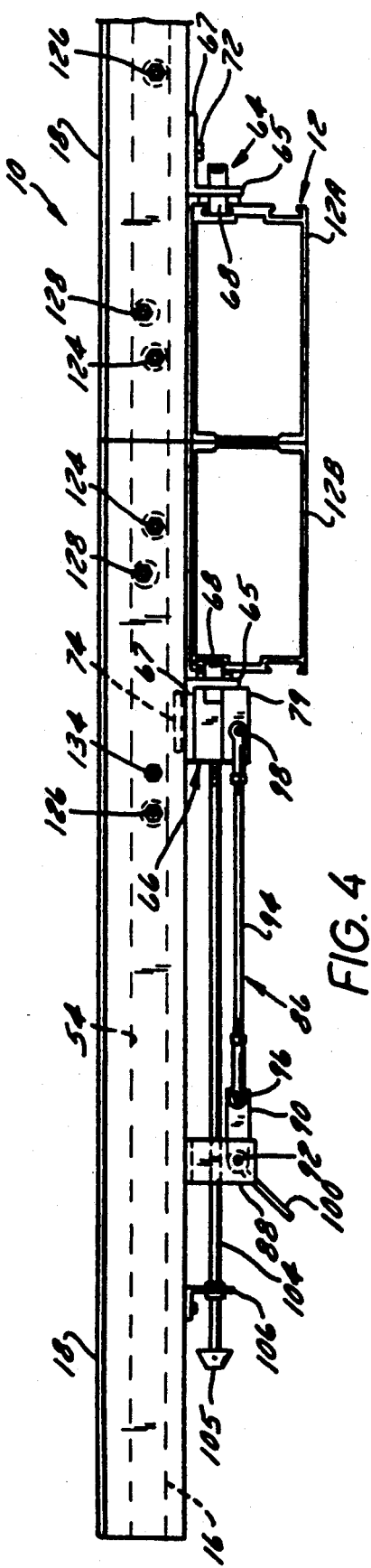
FIG. 4 is an end view of a portion of the universal bridge showing the slide arms attached to the center beam.
Figure 5:
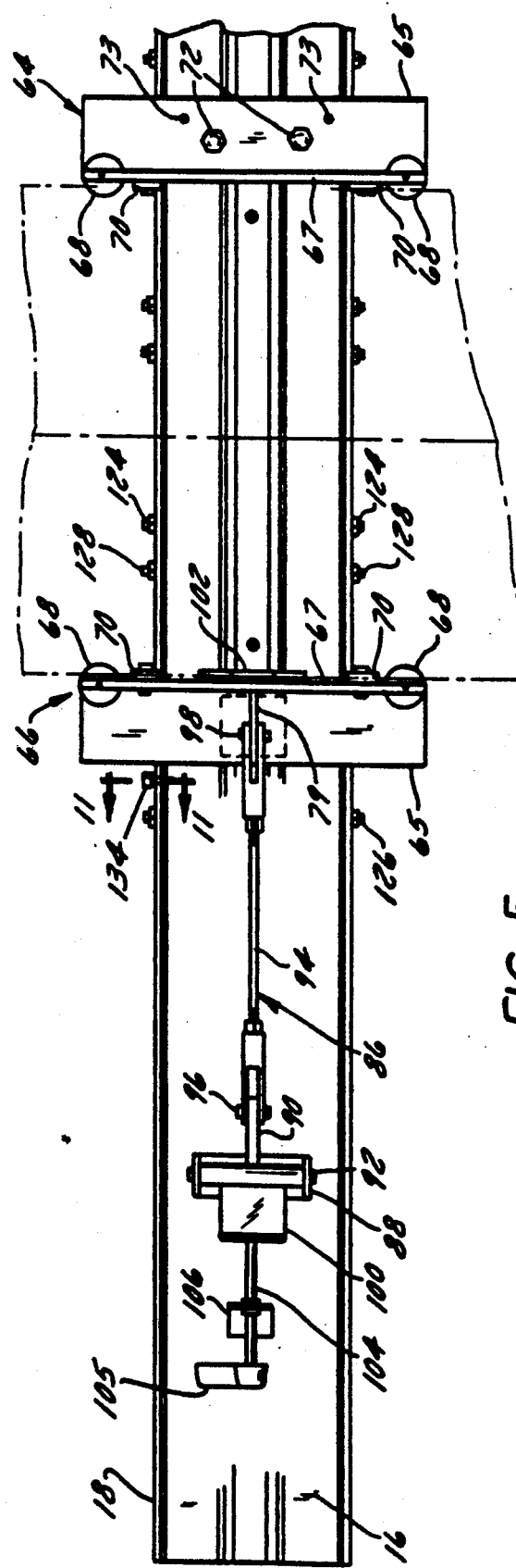
FIG. 5 is a view of the bottom of the slide arms aligned with the phantom lines for the center beam.

The slide arm 16 is aligned in a perpendicular relation to the main beam 12 by means of guides 64, 66 in the form of angle pieces having generally horizontal and vertical legs, 65, 67, respectively, as shown in FIGS. 4, 5 and 10. Each guide includes a first pair of centering rollers 68 and a pair of support rollers 70 mounted on vertical legs 67. The centering rollers are positioned to roll on the guide surfaces 42 and the support rollers 70 are positioned to ride on the lower tracks 44. It should be noted that the support rollers 70 are accurately located to provide a reference point for the tracks 58 and 60 on the slide arms 16. With this arrangement, the tracks 58 and 60 will always be located at the same distance from the tracks 44 on the main beams. The centering rollers 68 ride on the guide surfaces 42 on each side of the main beam 12 so that the slide arm is always located in a perpendicular relation to the main beam 12.

Means are provided for allowing the removal of the slide arm 16 from the main beam 12. Such means is provided by the guides 64, 66. In this regard, it should be noted that the guide 64 is permanently mounted to the slide arm 16 by bolts 72 and locating pins 73. The guide 64 will therefore be permanently secured in a perpendicular relation to the slide arm 16 thus assuring the slide arm 16 is perpendicular to the main beam when the centering rollers 68 engage guide surface 42. The guide 66 is mounted on the slide arm 16 for movement toward and away from the main beam 12 so that the slide arm 16 can be removed or mounted anywhere on the main beam without affecting either of the other two slide arms 16.

In this regard and referring to FIGS. 4, 5, 6 and 10, the movable guide 66 is shown supported on the slide arm 16 by means of a guide block 74 secured to the upper surface 76 of guide 66. As seen in FIG. 10, the guide block 74 includes threaded screws 75 which are screwed into threaded holes 77 provided in a support block 79 mounted on guide 66. The guide block 74 includes a finished surface 78 on the top and a flange 80 on each side of the block 74. The guide block 74 is aligned in groove 56 with the surface 78 in sliding engagement with finished surface 62 in the groove 56. The perpendicular relation of the movable guide 66 to the slide arm 16 is maintained by a pair of centering rollers 68.

The movable guide 66 is moved into and out of engagement with the main beam 12 by means of an over center linkage assembly 86 mounted on the slide arm 16. The linkage assembly includes a fixed bracket 88 mounted on slide arm 16. A lever arm 90 is pivotably mounted on the bracket 88 by a pin 92. One end of the lever arm 90 is connected to an actuating rod 94 by a pin 96. The other end of rod 94 is connected to support block 79 by a pin 98. A handle 100 is provided on the lever arm 90 for pivoting the arm 90 between open and closed positions. The movable guide 66 is shown in the open position in FIG. 6 and in the closed position in FIG. 4. The movable guide 66 is locked in the closed position by moving the lever arm 90 into an over center configuration. When the guide 66 is in the closed position, the centering rollers 68 will contact the surface 42 thereby allowing the slide arm 16 to be moved longitudinally along the main beam 12. Since the linkage assembly 86 is in an over center position, the movable guide 66 is in a locked position in relation to the surface 42.

Figures 12, 13, 14, 14A:
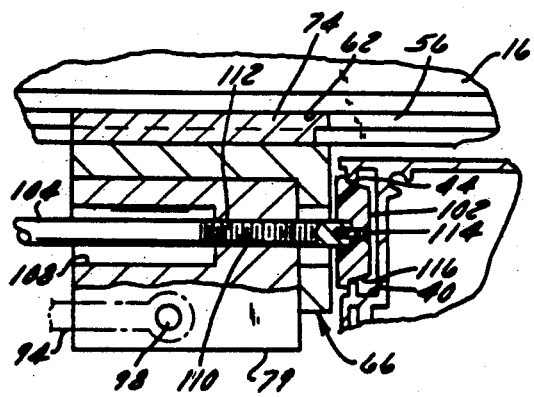
FIG. 12 is a cross section view of the centering block in the open position.
FIG. 13 is a view similar to FIG. 12 showing the centering block seated on the guide tracks.
FIG. 14 is a perspective view of the upper body slide arm assembly.
FIG. 14A is a cross sectional view along lines 14A-14A in FIG. 14.

Means are provided on the movable guide 66 for locking the slide arm 16 to the main beam 12 in order to seat the centering rollers 68 on fixed guide 64 in tight engagement with the surface 42 on main beam 12. Such means is in the form of a centering block 102 as shown in FIGS. 12 and 13. The centering block 102 is mounted on the end of an actuating rod 104 that is supported on slide arm 16 by support bracket 106 and the support block 79. In this regard, the support block 79 includes a centering hole 108 having a threaded section 110. The rod 104 includes a threaded end 112 which is screwed through the threaded section 110. The centering block 102 is secured to the end of rod 104 by means of a screw 114. The centering block 102 including beveled surfaces 116 on the top and bottom which are positioned to engage the upper and lower tracks 44 in groove 40. The centering block 102 is moved into engagement with the tracks 44 by rotating a handle 105 on the end of rod 104 to screw the section 112 of rod 104 through the threaded section 110 of hole 108.

Cross Slide

The cross slide 18 shown in FIGS. 8 through 10 is in the form of a "C" shaped channel member having side walls 118 connected by a top wall 120. The top wall 120 is provided with a precision extruded surface 122 which establishes the datum plane for the measuring bridge. In order to provide an accurate surface for determining the vertical relation of the datum points on a vehicle, the surfaces 122 on each of the cross slides 18 must lie in a common plane. In order to achieve this relationship, each of the cross slides 18 must be precisely mounted on the lower track 60 of the slide arms 16. This is accomplished by mounting two compensating guide roller assemblies 124, 126 on the inside surfaces of each of the side walls 118.

Referring to FIG. 8A a cross sectional view of one of the guide roller assemblies 124, 126 is shown. Each assembly includes a hex bushing 129 having a threaded bore 131 and a threaded outer surface 133. A lock nut 135 is mounted on the threaded surface 133 of the bushing 129. The bushing 129 is screwed into a threaded hole 127 provided in side wall 118. An eccentric screw 125 is screwed through the threaded bore 131 to support a roller 123. The screw 125 is used to raise or lower rollers 123 with respect to track 60. The bushing 129 is used to move the roller 123 into engagement with the inside surface of rails 61 so that the cross slides are precisely located on the slide arms 16. The lock nut 135 is then screwed into engagement with wall 118 to set the bushing.

Figure 7:
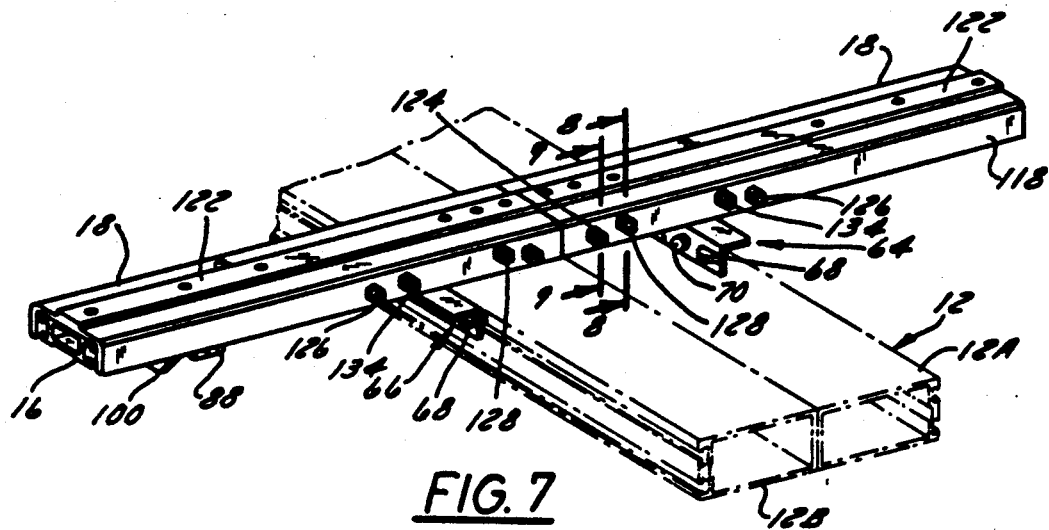
FIG. 7 is a perspective view of the slide arm shown mounted on the main beam.

As shown in FIGS. 7 and 8, guide roller assemblies 124, 126 are shown mounted on the inner end of the cross slide 18 in order to allow the outer end to extend beyond the end of the slide arm 16. The weight of the outer end of the cross slide will cause the inner end of the cross slide to lift the inner roller assembly 124 off the track 60. This is prevented by mounting compensating roller assemblies 128 on the inside of each side wall 118 in close proximity to the inner guide roller assemblies 124. A compensating roller 135 as seen in FIG. 9 is eccentrically mounted on the end of screws 130. By rotating the threaded screws 130, the compensating roller 135 is brought into engagement with the upper track 58, forcing the inner end of the cross slide downward to firmly seat the inner guide roller assemblies 124 on track 60. Once the inner roller assemblies 124 are seated on the track 60, a lock nut 132 is tightened on the screw 130 to lock the compensating roller 128 in position.

The assembly cross slides 18 are locked on the slide arms by means of thumb screws 134 which are mounted on one side of each cross slide 18. It should be noted that the thumb screw 134 will draw the rollers on the guide roller assemblies 124 and 126 toward the inside of the rails 61. The cross slide 18 will then be accurately aligned with the slide arm 16 both vertically and horizontally.

Overhead Bridge

Referring to FIG. 14, an upper body strut-type slide arm assembly 136 is shown which can be mounted on both ends of the main beam 12 after the measuring bridge 10 has been seated on the vehicle as shown in FIG. 2. Each assembly 136 includes a main slide arm 138 which extends outwardly beyond the sides of the vehicle. A fixed guide 140 is mounted on one side of the slide arm 138 and a movable guide assembly 142 is provided on the other side of slide arm 138. The guides 140 and 142 are identical to and operate the same as guide 64 and movable guide 66, respectively, as described above.

In this regard, the movable guide 142 is slidably secured to the slide arm 138 by means of a bracket 143 which is secured to the top of guide 76. A thumb screw 145 is provided in the middle of bracket 143 to lock the movable guide 76 to the underside of slide arm 138 when the centering rollers 68 engage the guide surfaces 42.

Means are provided for locking the slide arm 138 to the main beam 12. Such means can be in the form of a clamp assembly 201 which includes a channel member 203 having a top 204 and side walls 205 which rest on the top of the main beam 12. A block 206 is provided in the slide arm 136 which includes a threaded hole 209 located at the intersection of the longitudinal axis of the slide arm with the zero calibration point or center of the slide arm. Clearance holes 207 are provided in the slide arm 138 which are aligned with the threaded hole 209 in the block 206. A hole 210 is provided in the top 204 of the channel member which is aligned with holes 207. A screw 200 having a cap 208 is inserted through hole 210 and hole 207 and screwed into threaded hole 209. The slide arm 138 is mounted on the main beam 12 with the side walls 205 of the channel member resting on the main beam. The cap 208 is turned to rotate the screw 200 through the bottom hole 207 into engagement with the main beam 12. Continued rotation of the cap 208 will raise the slide arm 136 and seat the support rollers 70 on the upper rails 44A. Further tightening of the screw will lock the slide arm 138 to the main beam 12. It should be noted that the support rollers 70 are located at a distance from the upper surface of slide arm 138 which places the upper surface in the datum plane of the cross slides 18.

The slide arm 138 is stabilized by means of support assemblies 144 provided on each end of arm 138. Each assembly 144 includes a mounting block 146 which is secured to the end of the arm 138. Each block 146 includes a bore 148 and two threaded hole 150. A tube 152 is positioned in the bore 148 and a stabilizing bar 154 is pivotally mounted on the lower end of tube 152. The tube 152 is adjusted in the bore 148 to support the end of the arm 138 by seating the bar 154 on a support surface and screwing bolts 156 through holes 150 into engagement with tube 152. Vertical support poles 158 are mounted on each end of the slide arm 138 to support a cross bar 162 which is secured to the upper end of the poles 158 by means of adjustable brackets 164.

Figure 15:
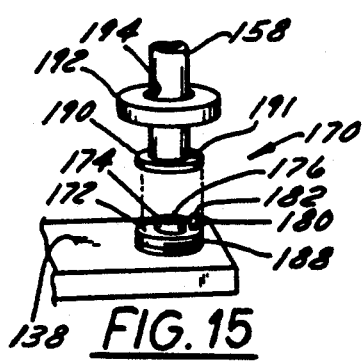
FIG. 15 is a perspective view of the mounting arrangement for vertical posts on the upper body slide arm assembly.
Figure 16:
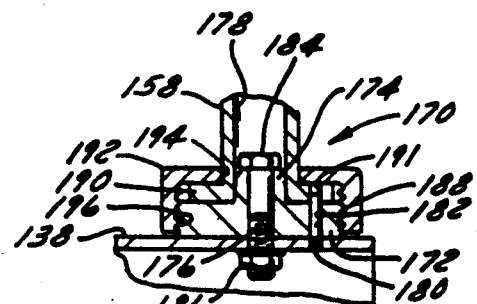
FIG. 16 is a cross sectional view of the vertical post mount.

The support poles 158 are secured to the ends of the slide arm 138 by means of an anchoring assembly 170 as shown in FIGS. 15 and 16. Each assembly includes a mounting plate 172 having a locating plug 174 and a central bore 176. It should be noted that the plug 174 has a diameter equal to the diameter of the bore 178 in pole 158. A locating hole 180 is provided in the plate 172 which is aligned with a dowel pin 182 provided in the top of slide arm 138. The dowel pin 182 projects above the plate 172. The plate 172 is secured to the slide arm 138 by means of a bolt 184 which is passed through the bore 176 into a threaded ring or nut 186 provided in slide arm 138. The outer surface 188 of plate 172 is threaded.

The pole 158 is provided with a mounting ring 190 which is secured to the end of the pole 158. A locating hole 191 is provided in ring 190. A collar 192 having a center opening 194 and an internally threaded flange 196 is mounted on pole 158 above ring 188. The pole 158 is centered on the plate 172 by aligning plug 174 with the bore 178 in pole 158 and the hole 191 in ring 190 with dowel 180. The pole 158 is secured to the plate 172 by screwing the flange 196 onto the threaded surface 188 of the plate 172 clamping ring 190 to upper surface of plate 172 and inner surface of collar 192. It is important to accurately align the pole onto the slide arm 138 since a measuring gauge (not shown) is provided on the outer surface of each pole 158.

To complete the upper body measuring system, a cross bar 162 is secured to the upper end of each pole 158 by means of vertically adjustable clamps 164. One or more longitudinally extending auxiliary bars 165 may be mounted on the cross bars 162 at each end of the main beam 12. Vertical pointers 166 and/or horizontal pointers 202 can be mounted on the cross bars 162 as well as the longitudinal bars 165 to locate datum points on the top and sides of the vehicle.

Thus, it should be apparent that there has been provided in accordance with the present invention a universal measuring system that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A universal measuring bridge for determining the misalignment of datum points on a damaged vehicle, said bridge comprising:
   a main beam,
   a slide arm, and
   means for supporting said slide arm for longitudinal movement with respect to said main beam, said slide arm supporting means including a fixed guide mounted on said slide arm, a movable guide mounted on said slide arm in a parallel spaced relation to said fixed guide and means for selectively moving said movable guide toward said fixed guide to clamp said slide arm onto the main beam.

2. The bridge according to claim 1 including a cross slide mounted on each end of said slide arm, and means for supporting said cross slides for longitudinal movement with respect to said slide arm.

3. The bridge according to claim 1 wherein said main beam includes a groove on each side, each groove including a reference surface and a longitudinal track, each of said guides including a first pair of rollers for engaging said reference surfaces for maintaining said slide arm in a perpendicular relation to said main beam and a second pair of rollers positioned to ride on said track to allow for longitudinal movement of said slide arm with respect to said main beam.

4. The bridge according to claim 1 including means mounted on said movable guide for locking said slide arm to said main beam.

5. The bridge according to claim 2 wherein said slide arm includes a groove on each side, each groove including an upper and a lower longitudinal track, said tracks being located in a parallel spaced relation to each other, said cross slides each including a pair of support rollers located on each side of said slide arm and positioned to ride on one of said tracks and a compensating roller located on each side of said slide arm and positioned to engage the other of said tracks, and means for adjusting the position of said compensating roller to maintain said first set of rollers on said one of said tracks as said cross slide is moved longitudinally with respect to said slide arm.

6. The bridge according to claim 3 wherein said slide arm includes a cross slide on each side, means for supporting said cross slides for longitudinal movement with respect to said slide arm, and means mounted on said cross slides for indicating the datum points on said vehicle.

7. The bridge according to claim 1 including means mounted in said main beam for biasing said bridge into engagement with the datum points on said vehicle.

8. The bridge according to claim 7 wherein said biasing means includes roller means for supporting said bridge for movement on a supporting surface.

9. The bridge according to claim 1 wherein said slide arm includes means for locating the datum points on the upper body of said vehicle.

10. The bridge according to claim 9 wherein said locating means comprises a vertical pole mounted on each end of said slide arm, a cross bar movably mounted on each pole and pointer assemblies mounted on said cross bar for identifying the datum points on the top and sides of the vehicle.

11. The bridge according to claim 10 including means for mounting said vertical poles on said slide arm, said means including a threaded plate mounted on said slide arm and a locating hub on the top of said plate, a locating ring mounted on the end of said pole for aligning said pole on said hub and an internally threaded collar mounted on said pole for securing said collar to said plate.

12. The bridge according to claim 11 including means on said plate for locating said collar on said plate.

13. A measuring bridge for identifying the proper location of datum points on a vehicle said bridge comprising:

a main beam formed from a pair of longitudinally extending box beams having inside walls and outside walls, each box beam including a calibrated groove on said outside wall and a pair of undercut grooves on said inside wall, said box beams being aligned with the calibrated grooves positioned in a parallel spaced relation and said inside walls in a facing relation, and means in the space between said inside walls for connecting said beams in a fixed relation, and a slide arm mounted for longitudinal movement on said main beam.

14. The bridge according to claim 13 including a cross slide mounted on each end of said slide arm, and a vertical attachment mounted on each cross slide for identifying the datum points on the frame of said vehicle.

15. The bridge according to claim 13 wherein said calibrated grooves in said box beams each include a reference surface and a roller track, and said slide arm includes a guide aligned with each side of said main beam, each guide including a first pair of rollers positioned to engage said reference surfaces to hold said slide arm in a perpendicular relation to said main beam and a second pair of rollers positioned to ride on said tracks.

16. The bridge according to claim 14 wherein said slide arm includes a calibrated groove on each side, each of said grooves in said slide arm having an upper track and a lower track, said tracks being located in a parallel spaced relation, each of said cross slides including a pair of rollers positioned to roll on said lower tracks in said slide arms and a compensating roller positioned to roll on said upper track, said compensating roller being eccentrically mounted for movement toward and away from said upper track whereby said rollers on said lower track can be moved into positive engagement with said lower track.

17. A universal measuring bridge for checking the location of datum points on a vehicle, said bridge comprising a main beam having longitudinally extending outer side walls, a groove in each side wall, each groove including a reference surface and an upper and a lower track, said surfaces and tracks being located in a parallel spaced relationship with respect to each other, a slide arm having longitudinally extending side walls, a first guide assembly secured to said slide arm in a transverse relation to said longitudinally extending side walls, means on said first guide assembly for supporting said slide arm on the tracks of one of said grooves for longitudinal movement with respect to said main beam, a second guide assembly secured to said slide arm for movement toward and away from said first guide assembly, means on said second guide assembly for supporting said slide arm on the tracks of the other of said grooves for longitudinal movement with respect to said main beam, and means mounted on said slide arm for selectively moving said second guide assembly into and out of engagement with said tracks whereby said slide arm can be removed from said main beam.

18. The bridge according to claim 17 wherein said slide arm includes a groove on each side wall,
each groove including an upper track and a lower track,
a cross slide mounted on each end of said slide arm,
each cross slide including a pair of support roller assemblies mounted on said cross slide on each side of said slide arm for supporting said cross slide for longitudinal motion on said lower tracks on said slide arm, and
a compensating roller assembly mounted on said cross slide between each pair of support rollers, said compensating roller assemblies being selectively movable into engagement with said upper tracks for holding said support roller assemblies in engagement with said lower tracks.

19. The bridge according to claim 18 wherein said cross slides each include a measuring surface and said support roller assemblies each include an eccentric axle for aligning said measuring surface in a parallel relation to said lower tracks and in a co-planar relation with said measuring surface on the other cross slide.

20. The bridge according to claim 17 wherein said main beam includes two extruded box beams, each having longitudinally extending inner side walls, and means for connecting said inner side walls with said reference surfaces and said tracks aligned in a fixed relation.

21. A universal measuring bridge for determining the misalignment of datum points on a damaged vehicle, said bridge comprising:
a main beam formed from two longitudinally extending box beams mounted in a side-by-side relationship,
a slide arm,
means for supporting said slide arm for longitudinal movement with respect to said main beam, said slide arm supporting means including a fixed guide mounted on said slide arm, a movable guide mounted on said slide arm in a parallel spaced relation to said fixed guide and means for selectively moving said movable guide toward said fixed guide to support said slide arm for longitudinal movement on said main beam, and
means for locking said slide arm in a fixed position on said main beam.

22. The bridge according to claim 21 including a cross slide mounted on each end of said slide arm, and means for supporting said cross slides for longitudinal movement with respect to said slide arm.

23. The bridge according to claim 21 wherein said main beam includes a groove on each side, each groove including a reference surface and upper and lower longitudinal tracks, each of said guides including a first pair of rollers for engaging said reference surface for maintaining said slide arm in a perpendicular relation to said main beam and a second pair of rollers positioned to engage one of said upper or lower tracks to allow for longitudinal movement on said main beam.

24. The bridge according to claim 21 wherein said locking means is mounted on said movable guide.

25. The bridge according to claim 23 wherein said locking means comprises a channel member mounted on said slide arm and resting on said main beam,
said slide arm including a threaded hole, a screw passing through said channel member and said threaded hole in said slide arm and engaging said main beam, whereby rotation of said screw will raise said slide arm off said main beam and seat said support rollers on the upper tracks.

26. The bridge according to claim 22 wherein said slide arm includes a groove on each side, each groove including an upper and a lower longitudinal track, said tracks being located in a parallel spaced relation to each other, said cross slide including a pair of support rollers on each side positioned to ride on one of said tracks and a compensating roller on each side positioned to engage the other of said tracks, and means for adjusting the position of said compensating roller to maintain said first set of rollers on said one of said tracks as said cross slide is moved longitudinally with respect to said slide arm.

27. The bridge according to claim 21 including means mounted in said main beam for biasing said bridge into engagement with the datum points on said vehicle.

28. The bridge according to claim 27 wherein said biasing means includes roller means for supporting said bridge for movement on a supporting surface.

29. The bridge according to claim 21 wherein said slide arm includes means for locating the datum points on the upper body of said vehicle.

30. The bridge according to claim 29 including means at each end of said slide arm for stabilizing said slide arm.

31. The bridge according to claim 30 including a vertical pole mounted on each end of said slide arm and a cross bar mounted for vertical adjustment on each pole.

* * * * *